J. HOLST.
PUMP.
APPLICATION FILED FEB. 6, 1917.

1,334,935.

Patented Mar. 23, 1920.
8 SHEETS—SHEET 1.

INVENTOR
John Holst
BY
Harry C. Schweder
ATTORNEY

INVENTOR
John Holst

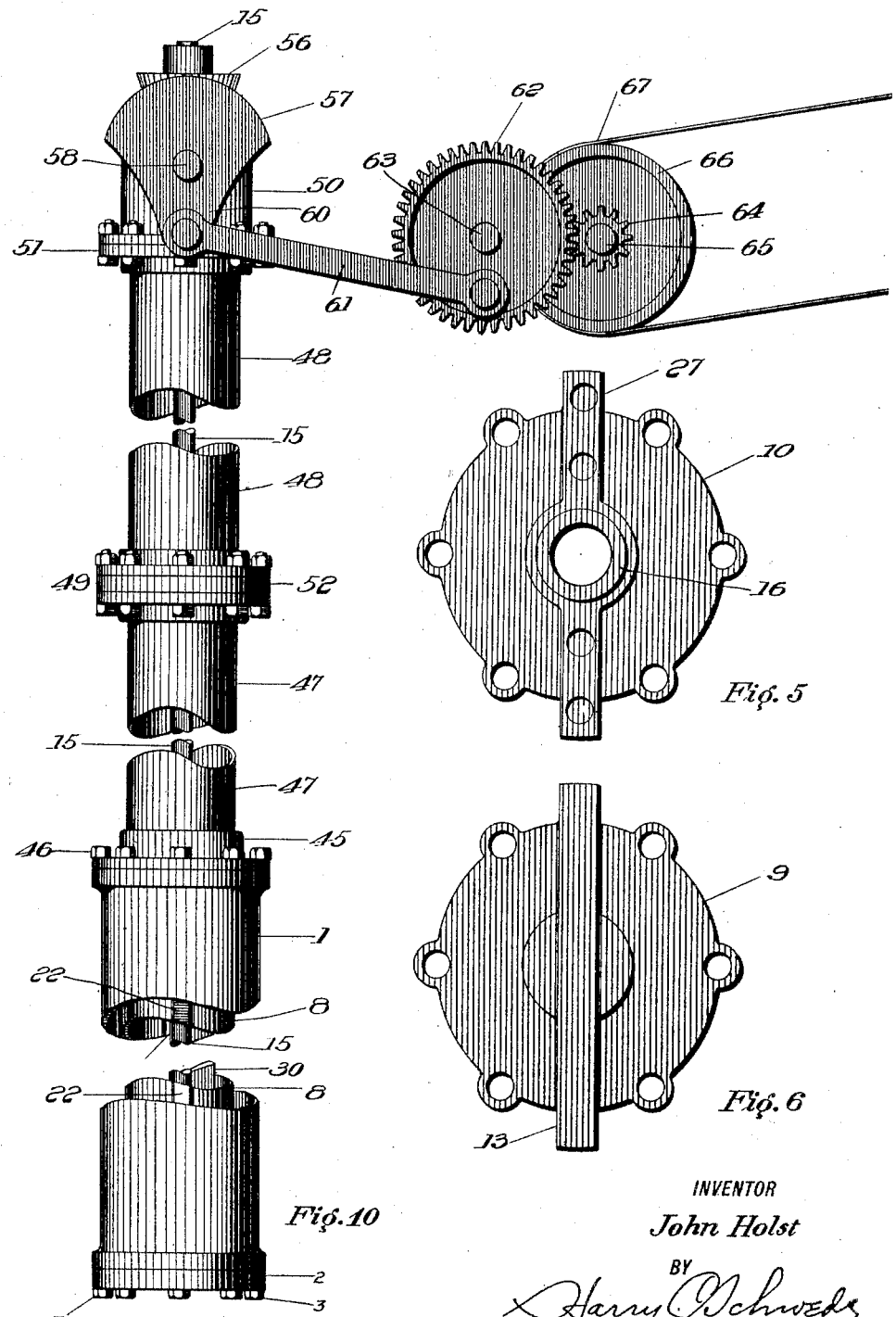

J. HOLST.
PUMP.
APPLICATION FILED FEB. 6, 1917.

1,334,935.

Patented Mar. 23, 1920.
8 SHEETS—SHEET 5.

INVENTOR
John Holst
BY
Harry C. Schroeder
ATTORNEY

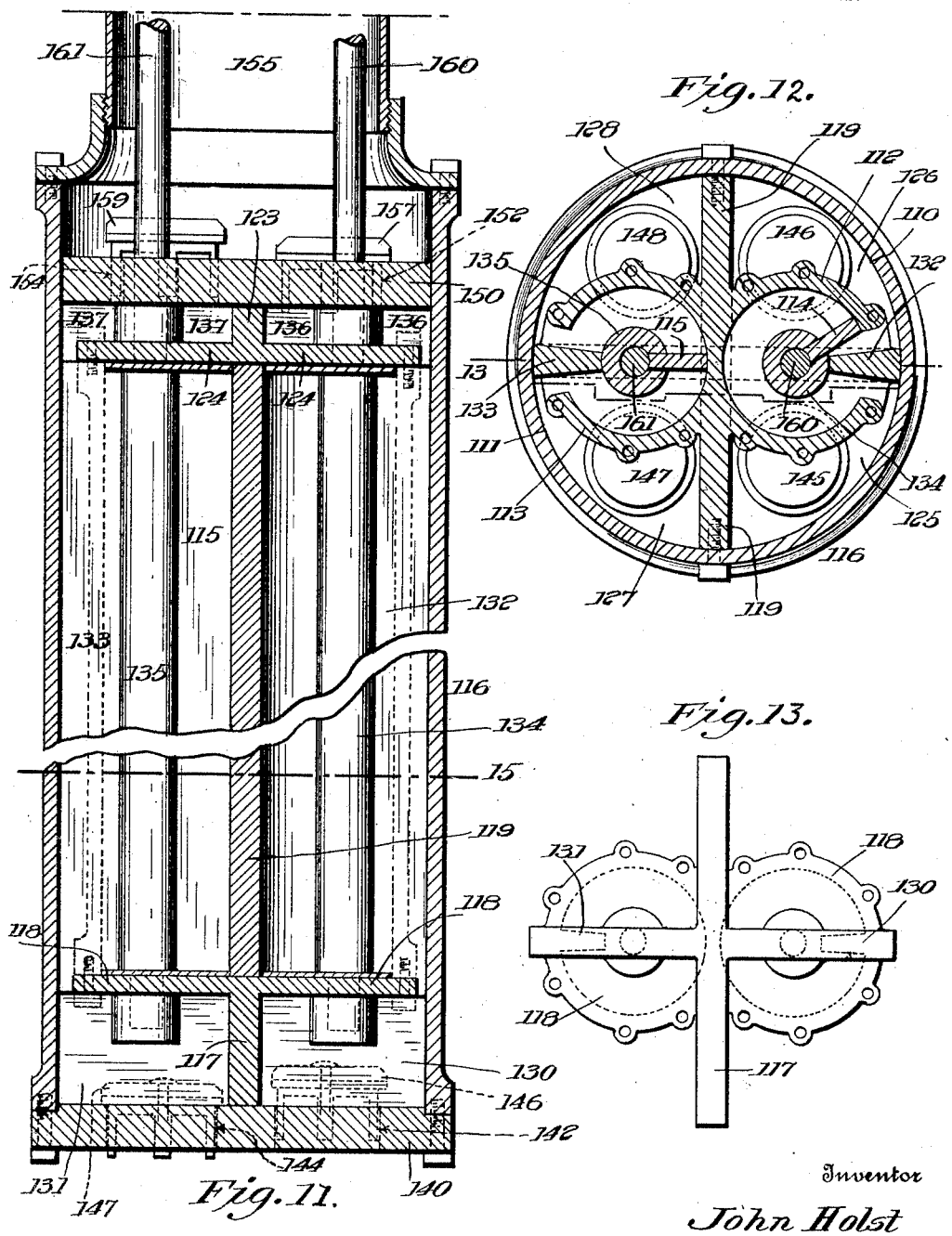

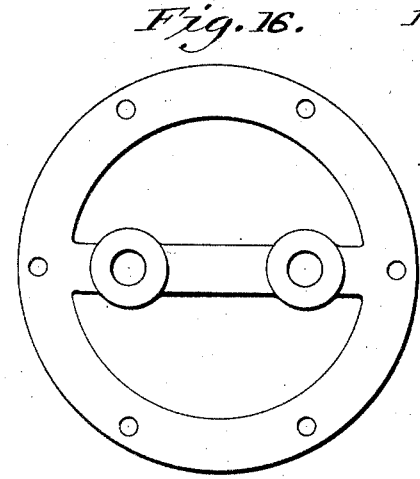
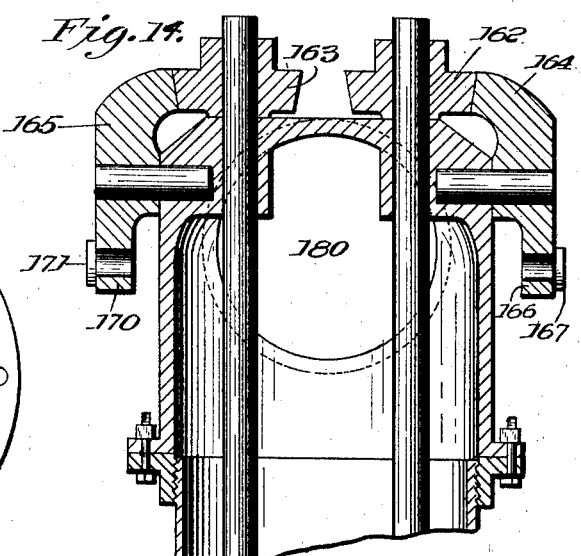
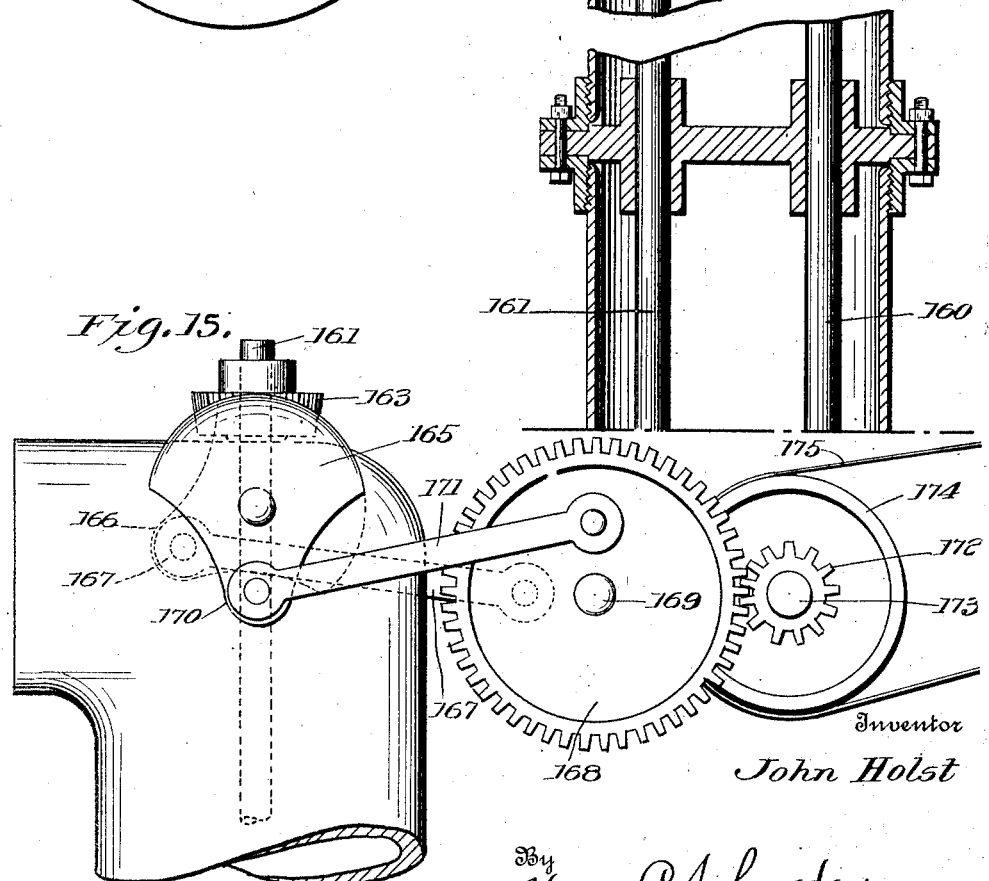

J. HOLST.
PUMP.
APPLICATION FILED FEB. 6, 1917.

1,334,935.

Patented Mar. 23, 1920.
8 SHEETS—SHEET 8.

Inventor
John Holst
By Harry C. Schroeder
Attorney

UNITED STATES PATENT OFFICE.

JOHN HOLST, OF OAKLAND, CALIFORNIA.

PUMP.

1,334,935. Specification of Letters Patent. Patented Mar. 23, 1920.

Application filed February 6, 1917. Serial No. 146,980.

*To all whom it may concern:*

Be it known that I, JOHN HOLST, a citizen of the United States, residing at Oakland, in the county of Alameda and State of California, have invented certain new and useful Improvements in Pumps, of which the following is a specification.

This invention relates to pumps.

The invention comprises generally a pump with an improved piston having great pumping capacity.

The invention also comprises a pump of great pumping capacity which may be operated by mechanism having a minimum movement.

More particularly the invention comprises a pump with an elongated rotary or oscillative piston which provides enlarged suction and compression chambers and increases the pumping capacity of the pump.

Other novel features of the invention will appear hereinafter.

The invention is illustrated in the accompanying drawings, which form a part of this specification and the appended claim.

Referring to the drawings:

Fig. 5 is a top plan view of the upper head of the piston chamber.

Fig. 6 is a bottom plan view of the lower head of the piston chamber.

Fig. 10 is an elevation of the pump.

Fig. 11 is a vertical sectional view, taken on line 13 of Fig. 12 of a modified form of my invention embodying a double and continuous acting pump.

Fig. 12 is a cross sectional view of the pump shown in Fig. 11 taken on line 15 of said figure.

Fig. 13 is a bottom plan view of the lower head of the piston chamber of the pump shown in Figs. 11 and 12.

Fig. 14 is a vertical sectional view of the upper portion of the pump shown in Fig. 11.

Fig. 15 is a side view of the top portion of the pump shown in Fig. 14, showing the means whereby the pump is operated.

Fig. 16 is a plan view of one of the bearings for the piston shaft.

Figure 1:
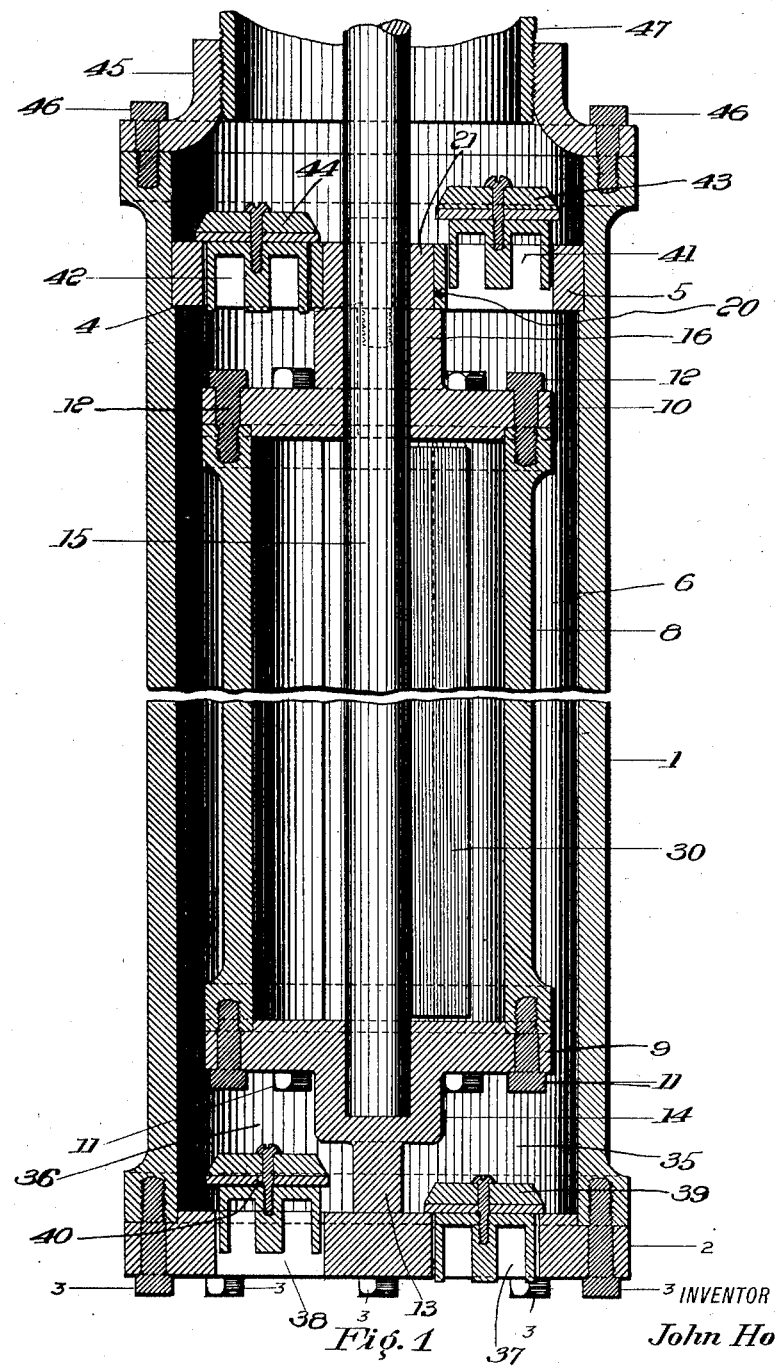
Figure 1 is a vertical sectional view of the lower portion of the pump.

Numeral 1 indicates the lower section of the pump casing which is closed at its lower end by head 2, the head being bolted to said casing section by bolts 3. The upper portion of the interior of the lower casing section is enlarged, providing a shoulder 4 upon which rests a head 5. The space confined within the lower casing section 1, and lower and upper heads 2 and 5 form a pumping chamber 6.

Within said pumping chamber is located a piston casing 8, and lower and upper heads 9 and 10, said heads being bolted to the ends of the casing by bolts 11 and 12. The lower head 9 has a downwardly extending wall 13 which rests upon the lower pump casing head 2 and supports the piston casing. The lower piston casing head is formed with a bearing 14 in which is journaled the lower end of piston shaft 15, which shaft extends through and is also journaled in a bearing 16 formed in the upper head 10 of the piston chamber. The wall 13 on the lower head of the piston casing extends entirely across the casing section 1 and engages the interior surface of the said section at diametrically opposite points which engagement prevents lateral displacement of the piston chamber in the pumping chamber.

The upper head 5 of the pumping chamber is provided with a central opening 20 which receives the upper reduced portion 21 of the piston bearing 16 on the upper head of the piston chamber, whereby the bearing 16 and the upper end of the piston chamber are maintained in their proper position against displacement with relation to the pump chamber 6 and upper pump casing to be described.

The piston chamber casing 8 has an outwardly extending wall 22 extending the entire length of the casing which rests upon the top of wall 13 of the lower piston chamber head, and engages the inner surface of the pump chamber casing 1. The piston chamber casing is provided with a longitudinal slot 23. A wall 24 projects inwardly from the pump chamber casing 1 through the slot 23, the entire length of the slot, and to the piston shaft 15, dividing the slot 23 into two ports 25 and 26. The upper piston casing head 10 has a diametrically extending wall 27 which fits over the top of walls 22 and 24 and against the under side of the upper pump chamber head 5. A blade piston 30 extends radially from the piston shaft to the inner surface of the piston chamber casing and is adapted to rotate with the piston shaft 15. One piston pumping chamber 35 is formed by the space between the pump chamber casing 1, one side of piston casing 8, one side of walls 13, 22 and 24, and wall 27; between the pump chamber heads 2 and 5; port 25 and the space within the piston chamber at one side of the piston 30, which chamber constitutes a suction or a compression chamber according to the direction of rotation of the piston shaft and piston. Another pumping chamber 36 is formed by the space between the pump chamber casing 1, the other side of piston casing 8, one side of walls 13, 22 and 24 and wall 27; between the pump chamber heads 2 and 5; port 26, and the space within the piston chamber at the other side of the piston 30, which chamber constitutes a suction or compression chamber according to the direction of rotation of the piston shaft and piston. The head 2 of the pump chamber is provided with two valve openings 37 and 38, which lead from the outside of the pump chamber to the pumping chambers 35 and 36 respectively. Valves 39 and 40 are adapted to control communication through said valve openings between the outside of the pump chamber and the pumping chambers 35 and 36 respectively.

The upper head 5 of the pump chamber 6 is provided with two valve openings 41 and 42 which lead from the pumping chambers 35 and 36 respectively into the upper end of the lower section 1 of the pump casing. Valves 43 and 44 are adapted to control communication through said valve openings between said pumping chambers 35 and 36 respectively and the upper end of the lower section 1 of the pump casing.

A coupling 45 is bolted by bolts 46 to the top of the lower section 1 of the pump casing, into which coupling screws the lower end of the next section 47 of the pump casing. Any number of casing sections may be arranged above the section 47 according to the length of the pump casing desired. As shown in Fig. 10, a casing section 48 is coupled at its lower end by coupling 49 to the top of section 47, and a casing head 50 is coupled by coupling 51 to the top of section 48. A bearing frame 52 is secured by coupling 49 within the pump casing between the adjacent ends of the sections 47 and 48, on which frame is formed a bearing 53 through which the intermediate portion of the piston shaft extends and in which said portion of the piston shaft is journaled. The frame 52 is provided with openings 54 for maintaining communication between the casing sections 47 and 48.

A bearing 55 is formed with the upper wall of the casing head 50, through which and said upper wall the upper end of the piston shaft extends and in which bearing the upper portion of said shaft is journaled. The head 50 has a spout 50ˣ through which water is delivered from the pump. A beveled gear 56 is secured to the upper end of the piston shaft, above the pump casing head 50, which gear meshes with a beveled segmental gear 57, which is secured on a stud shaft 58 journaled in a bearing 59 in one side of the pump casing head 50. The segmental gear 57 has a depending arm 60 to which is connected one end of pitman 61, the other end of which pitman is connected eccentrically to a gear 62 mounted on shaft 63 suitably journaled. The gear 62 meshes with a pinion 64 on a suitably journaled shaft 65, on which shaft is mounted a pulley 66 over which travels a belt 67, by means of which power is applied to the pulley to rotate shaft 65 and operate the pump as will be described.

The operation of the pump as above described is as follows:

Power is applied to the belt 67 to rotate the pulley 66, shaft 65 and pinion 64 to the right or in a clockwise direction. The pinion 64 rotates the gear 62 to the left or in a counter-clockwise direction, which moves the pitman 61 to the right and turns the segmental gear in a counter-clockwise direction, which movement of the segmental gear turns the gear 56, piston shaft 15 and piston 30 in a counter-clockwise direction. As the piston is so turned, suction is created in the pumping chamber 35, which closes valve 43 and opens the valve 39 and draws water through the opening 37 into chamber 35 and fills said chamber with water, during which operation the chamber 36 becomes a compression chamber and closes valve 40 and opens valve 44, and water that may be in chamber 36 is forced out through the valve opening 42, up through the pump casing and is delivered from the pump through the spout 54. As the rotation of the gear 62 is continued as above described, and the pitman passes over the dead center of said gear, the pitman is moved to the left, whereby the segmental gear 57 is turned in a clockwise direction and gear 56, piston shaft 15 and piston 30 are turned in a counter-clockwise direction, during which movement of the piston, the pumping chamber 36 becomes a suction chamber and the pumping chamber 35 becomes a compression chamber, whereupon valve 44 is closed and valve 40 is opened and water is drawn through valve opening 38, into the chamber 36 and fills said chamber, while valve 39 is closed and valve 43 opened and water is forced out of the chamber 35 through valve opening 41 and up through the pump casing from which the water is delivered through spout 54. As the rotation of the gear 53 is continued the piston is oscillated and the above described operations are repeated.

A great advantage of my oscillating piston is that its stroke for a given pumping capacity is considerably shorter than that of a reciprocating plunger pump and the length of the plunger may be increased or decreased to vary the pumping capacity of the pump without varying the stroke of the piston.

My pump may be advantageously employed with great pumping capacity in small bored deep wells or in connection with a windmill or other means whereby only a short stroke may be imparted thereby to a pump piston.

Figure 2:
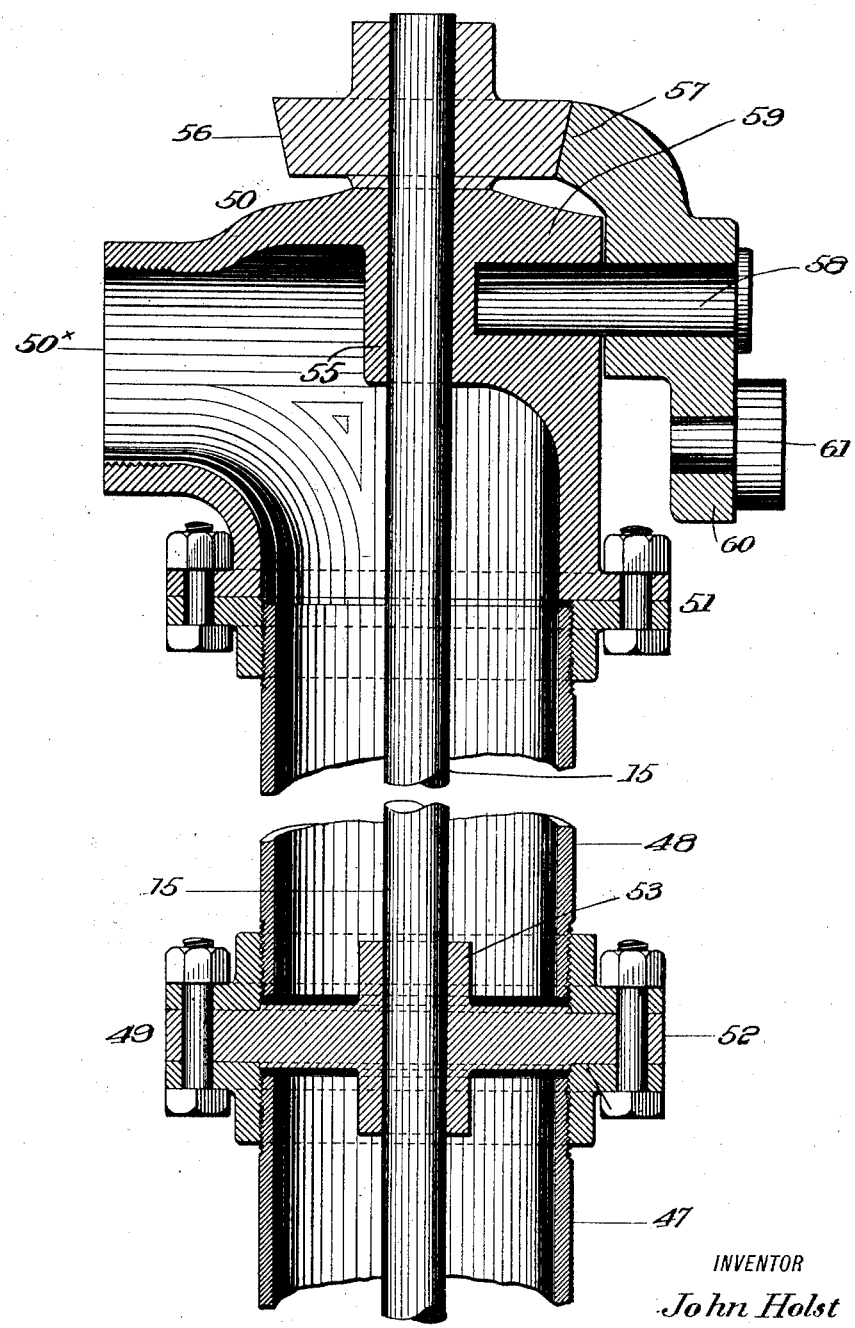
Fig. 2 is a vertical sectional view of the upper portion of the pump.
Figure 3:
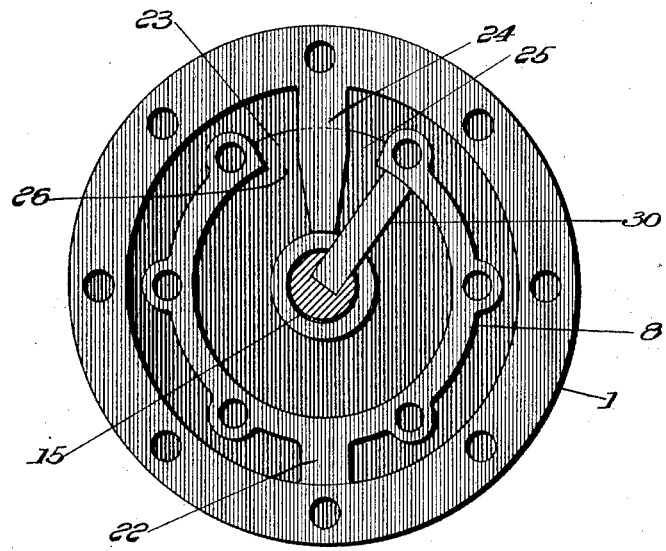
Fig. 3 is a view in plan of the lower section of the pump, certain parts being removed to show the piston chamber and piston.
Figure 4:
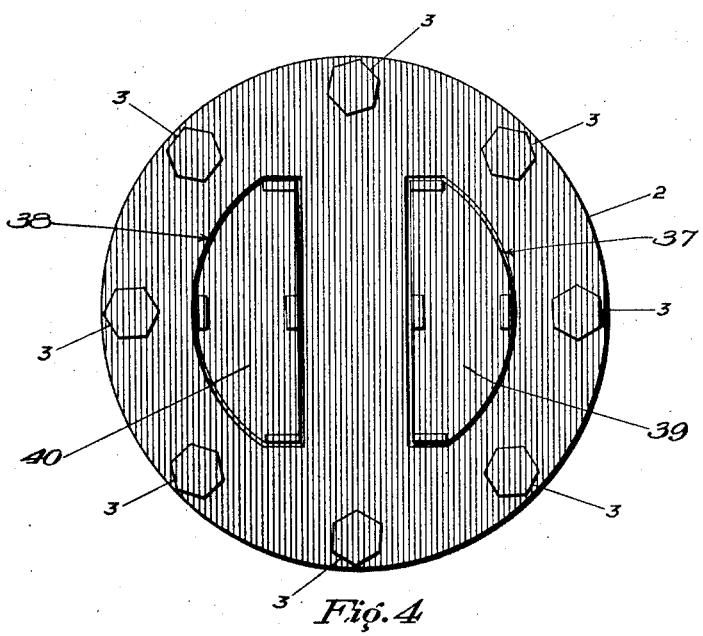
Fig. 4 is a bottom plan view of the pump.
Figure 7:
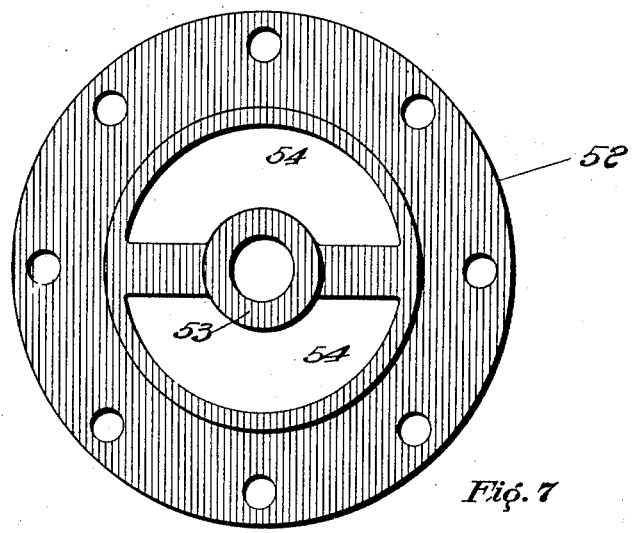
Fig. 7 is a plan view of one of the bearings for the piston shaft.
Figure 8:
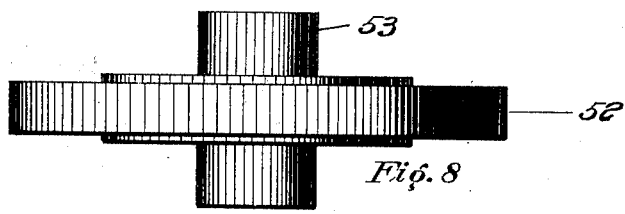
Fig. 8 is a side view of said bearing.
Figure 9:
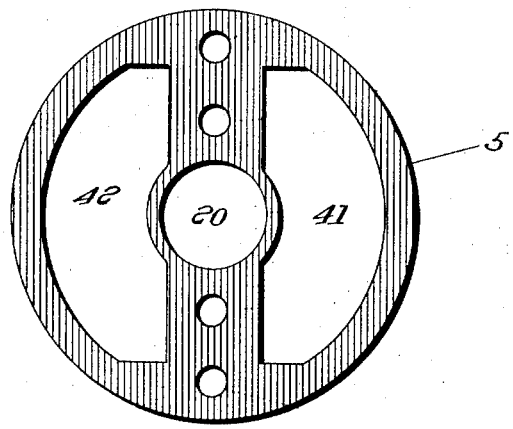
Fig. 9 is a plan view of the upper head of the pumping chamber.
Figure 17:
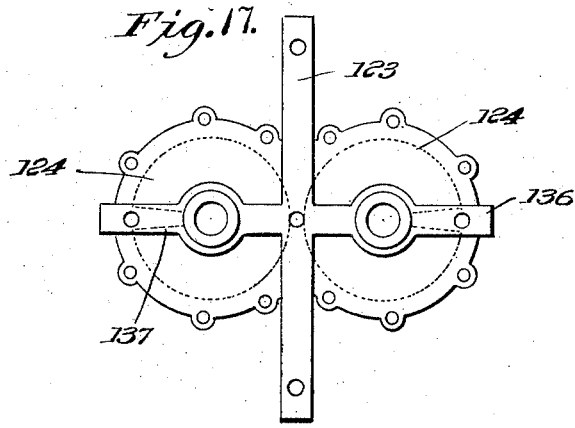
Fig. 17 is a top plan of the upper head of the piston chamber.
Figure 18:
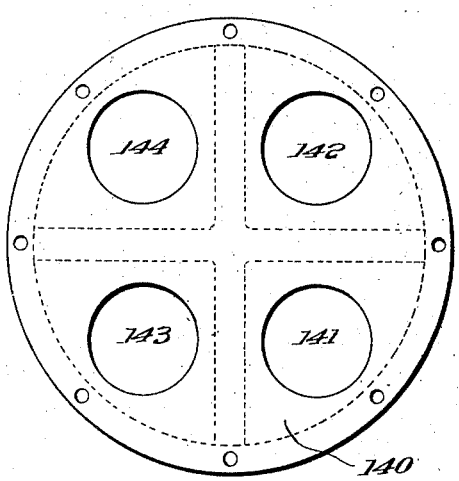
Fig. 18 is a plan of the lower head of the pump chamber.
Figure 19:
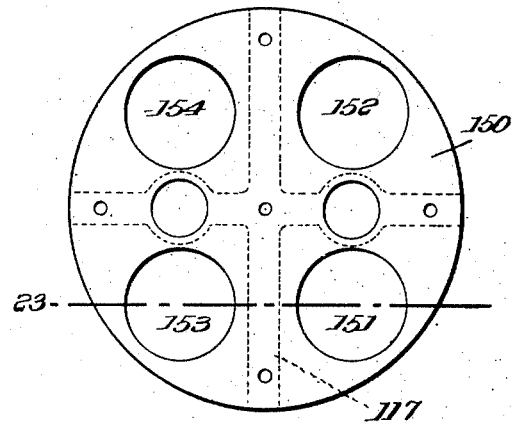
Fig. 19 is a plan of the upper head of the pump chamber.
Figure 20:
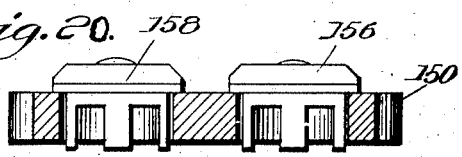
Fig. 20 is a sectional view taken on line 23 of Fig 19.

In the modified form of my invention shown in Figs. 11 to 20 inclusive, a double acting and a continuous acting pump is provided. In this form of my invention two pump chambers 110 and 111 and two piston casings 112 and 113 and two pistons 114 and 115 mounted in said casing are provided in the lower pump casing section 116. The pump chambers 110 and 111 are divided by wall 117 depending from the heads 118 of the piston casings 112 and 113, wall 119 extending between piston casings 112 and 113 and wall 123 on the top of the upper piston chamber head 124. The construction of each piston casing 112 and 113, and each piston 114 and 115 is the same as that shown in Figs. 1 to 10 inclusive. The pump chambers 110 and 111 are respectively divided into two piston chambers 125 and 126, and 127 and 128 by walls 130 and 131 depending from the head 118, by walls 132 and 133 projecting into the side openings in the piston chambers to the piston hubs 134 and 135, by pistons 114 and 115, and by walls 136 and 137 on the upper heads 124 of the piston casings. The lower head 140 of the pump chamber is provided with four inlets 141, 142, 143 and 144 which communicate respectively with pump chambers 125, 126, 127 and 128, which inlets are controlled by valves 145, 146, 147 and 148 respectively. The upper head 150 is provided with four outlets 151, 152, 153 and 154 which respectively lead from the piston chambers 125, 126, 127 and 128 into the upper pump casing 155. Said outlets are respectively controlled by valves 156, 157, 158 and 159.

On the upper ends of the piston shafts 160 and 161 which are journaled in bearings in the lower and upper heads 118 and 124 of the pump casing, are secured beveled gears 162 and 163 which respectively mesh with segmental gears 164 and 165 journaled in the top of the pump casing. The segmental gear 164 has an arm 166 to which is connected one end of pitman 167, the other end of which pitman is connected eccentrically to a gear 168 mounted on shaft 169 suitably journaled. The segmental gear 165 has an arm 170 which is connected to one end of pitman 171, the other end of which is connected eccentrically to gear 168 at a point preferably 90 degrees from the point of connection of the pitman 167 to the gear, so that one piston, through its piston shaft, its gear and meshing segmental gear, will always be working and pumping while the other piston is changing its direction of movement and is not pumping whereby the pump operates continuously. The gear 168 meshes with pinion 172, on shaft 173 suitably journaled on which shaft is a pulley 174 adapted to be driven by power (not shown) through belt 175.

The operation of this form of my invention is as follows:

Power is applied through belt 175, pulley 174, shaft 173, and pinion 172 to rotate gear 168 in a counterclockwise direction. As said gear is so rotated pitman 167 is moved to the right and gear 162, piston shaft 160 and piston 114 are moved in a counter-clockwise direction during which movement valve 157 is closed and the valve 146 is opened by suction and water is drawn into chamber 126, while valve 145 is closed and valve 157 is opened by the compression in chamber 125 and the water is forced out of said chamber through outlet 151 and up through the pump casing and out through delivery opening 180 at the top of the pump. During these operations pitman 171 is moved to the left and gear 163, piston shaft 161, and piston 115 are moved in a clockwise direction, during which movement, valve 159 is closed and valve 148 is opened by suction and water is drawn into chamber 128, while valve 147 is closed and valve 152 is opened by the compression of the water in chamber 127 and the water is forced out of said chamber through outlet 143 and up through the pump casing and out through delivery 180. As the rotation of the gear 168 is continued the pitman 167 and piston 115 reach the end of their stroke and reverse their movement, when the pitman 171 and piston 114 have moved only half the length of their stroke, and the piston 114 continues its pumping operation while the piston 115 is reversing and not pumping, thus making the pumping operation of the pump continuous at this point. During the reverse and counter-clockwise movement of the piston 115, valve 152 is closed and valve 147 is opened and the chamber 127 filled with water, while valve 148 is closed and valve 159 opened and water pumped up through outlet 144 and the pump casing and out through delivery 180. The pitman 167 and piston 114 reach the end of their stroke when the piston 115 is midway of its stroke and the piston 115 performs its pumping operation while piston 114 is reversing, thus making the operation of the pump continuous at this point. During the reverse and clockwise movement of the piston 114, the valve 156 is closed and the valve 145 opened by suction and the chamber 125 filled with water, while valve 146 is closed and valve 157 opened and water pumped out through outlet 152 up through the pump casing and out through the delivery 180. The piston 115 reaches the end of its reverse stroke when the piston 114 has reached only half the length of its stroke and the piston 114 continues pumping while the piston 115 is changing its stroke to move forward again, thus making the pump continuous in its operation at this point. The pump has now completed its cycle of operations which are then repeated. Inasmuch as one piston is at the maximum power of its stroke and always pumping while the other piston is changing its stroke, the pumping operation of the pump is continuous and uniform.

Having described my invention I claim as new and desire to secure by Letters Patent:

A pump including a casing, a pump chamber mounted in said casing, said chamber being provided with a slot in one side, an oscillative piston mounted in said pump chamber and extending to the inner surface of the wall of said pump chamber, a partition wall extending from the wall of said casing through said slot to the shaft of said piston, said casing being provided with an inlet at each side of said partition wall, an inlet valve for each inlet, said casing being provided with an outlet at each side of said partition wall, an outlet valve for each outlet, and means for oscillating said piston from one side of said partition wall to the other.

In testimony whereof I affix my signature.

JOHN HOLST.